United States Patent [19]

Levine et al.

[11] Patent Number: 4,606,401

[45] Date of Patent: Aug. 19, 1986

[54] PROGRAMMABLE THERMOSTAT

[75] Inventors: Michael R. Levine; James T. Russo; Anthony C. Cairo; Victor H. Rigotti, all of Ann Arbor, Mich.

[73] Assignee: Honeywell, Inc., Minneapolis, Minn.

[21] Appl. No.: 709,918

[22] Filed: Mar. 8, 1985

[51] Int. Cl.⁴ ............................................. F23N 5/20
[52] U.S. Cl. ......................................... 165/12; 236/94
[58] Field of Search ................. 165/12; 236/46 R, 47; 364/505, 557

[56] References Cited

U.S. PATENT DOCUMENTS

| | | | |
|---|---|---|---|
| 4,316,256 | 2/1982 | Hendricks et al. | 236/46 R |
| 4,382,544 | 5/1983 | Stewart | 165/12 X |
| 4,442,972 | 4/1984 | Sahay et al. | 165/12 X |

Primary Examiner—William E. Wayner
Attorney, Agent, or Firm—Krass & Young

[57] ABSTRACT

A programmable thermostat employing means for sensing the ambient temperature on the thermostat, a clock for generating digital electrical signals representative of real time, a programmable digital memory for retaining a schedule of times and temperature ranges for a particular repetitive time cycle, display means for indicating selected information including programming mode, time, and temperature conditions during the programming and operation of the device, and control means for interrogating the current temperature range in the times-temperatures schedule, determining whether the ambient temperature on the thermostat is within that range, and generating a control signal to the furnace or air conditioner when appropriate.

16 Claims, 7 Drawing Figures

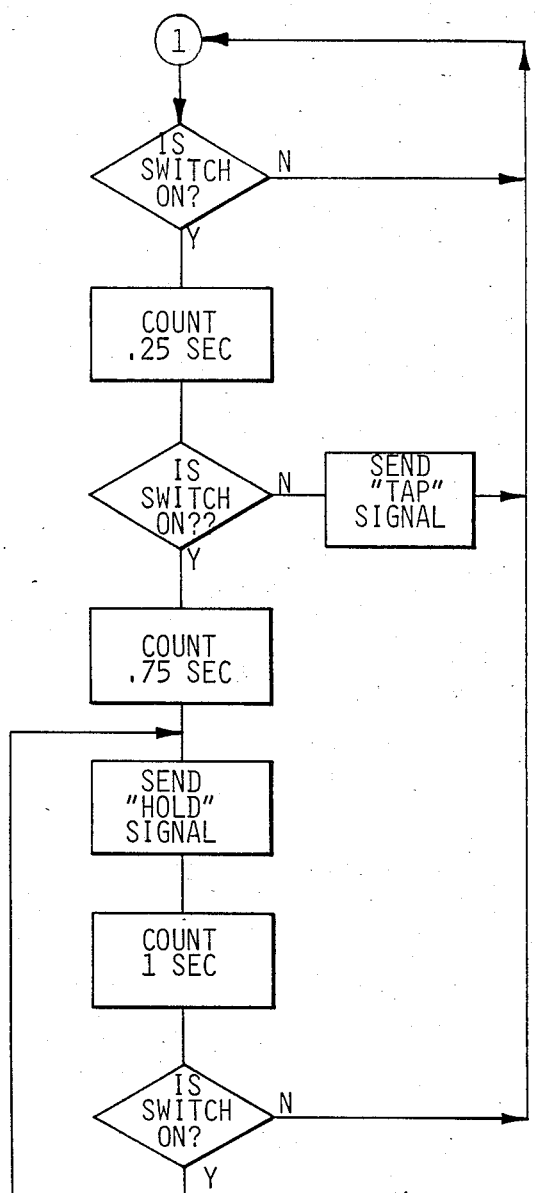
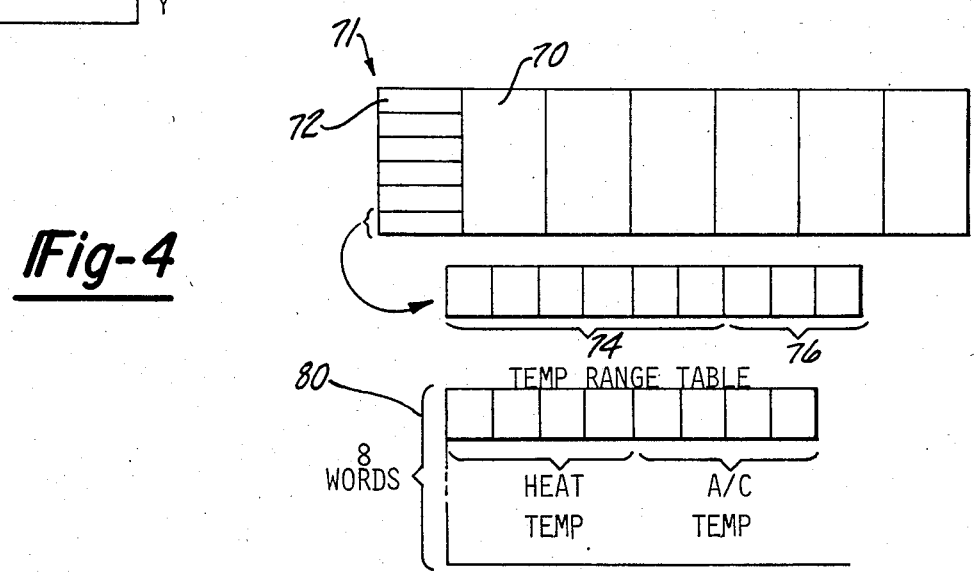
*Fig-2*
*Fig-4*

4,606,401

PROGRAMMABLE THERMOSTAT

FIELD OF THE INVENTION

This invention relates generally to electronic thermostats for providing temperature dependent control signals to one or more temperature modifying loads and more particularly to a digital programmable thermostat having a series of multifunction program input buttons and multimode display means, providing for fast, convenient user friendly operation of the device.

BACKGROUND OF THE INVENTION

Thermostat controlled systems for heating furnaces and/or air cooling systems (hereinafter collectively referred to as "furnaces") of the type employed in residences and many commercial and industrial buildings often include means for manually entering a desired temperature set point, means for measuring the actual temperature within the building, and means for switching the furnace on or off as a function of the difference between the set point temperature and actual temperature.

The availability of inexpensive integrated circuits incorporating large numbers of digital devices on a single semiconductor chip has lead to the development of programmable electronic thermostats including means for storing a schedule of desired temperatures at specified times within a respective period such as a day or a week. For example, U.S. Pat. Nos. 4,206,872 and 4,314,665, disclose a thermostat for generating control signals for a furnace employing a digital memory for storing a desired temperature-time program for the thermostat for a repetitive period.

While electronic programmable thermostats enjoy both cost and reliability advantages over conventional mechanical thermostats, they are often limited in their operation and may be difficult or inconvenient for the average homeowner to program and operate.

In particular, the limited data entry means and limited displays often make it difficult for homeowners unfamiliar with simple computer device programming to succesfully program the device or take advantage of all of the features offered by the device.

It is therefore an object of the present invention to provide a programmable thermostat including a display having simple, clear, graphic indications of the current mode and operable parameters, and simple, easy-to-understand program entry means to ensure efficient "user friendly" programming and operation by a typical homeowner.

It is another object of the present invention to provide a programmable thermostat including means for entering a desired temperature for the heating unit and a desired temperature for the cooling unit for each of the times in the time-temperature schedule.

It is another object of the invention to provide display means for displaying the two temperatures associated with the particular time-temperature point in a schedule as a range of temperatures, bounded at either end by the desired heating and cooling temperatures respectively.

It is yet another object of the present invention to provide an electronic programmable thermostat including means for entering an entire time-temperature schedule at one time.

SUMMARY OF THE INVENTION

The thermostat of the present invention employs means for generating an electrical signal which varies as a function of the ambient temperature on the thermostat, a clock for generating digital electrical signals representative of real time, a programmable, digital memory for retaining a schedule of times and temperature ranges for a particular repetitive time cycle, display means for indicating certain modes, time and temperature conditions during the programming and operation of the device, and control means for interrogating the current temperature range in the time-temperature schedule, determining whether the ambient temperature on the thermostat is within that range, and generating a control signal to the furnace or air conditioner when appropriate.

The device also employs a series of manual controls which, in concert with the display means, allow a user unskilled at programming digital electronic devices to program a set of time-temperature schedules, review those schedules, and/or override the scheduled temperature range at any particular time.

The display means in the preferred embodiment of the present invention may display one or more of the following parameters depending upon the current mode:

(a) a temperature range corresponding to the current temperature range in effect or corresponding to a particular selected time in the programmed schedule.

(b) the current real time or one of the programmed times in the time-temperature schedule;

(c) the current day of the week or the day corresponding to a particular time-temperatures setting in the schedule; and (d) a word description of the current mode.

The temperature ranges are displayed as a series of bar segments with each individual bar segment corresponding to a particular position on a preselected temperature scale. The end-most bar segments represent the lower and upper temperature limits for initiating operation of the heating and cooling units respectively. These bar segments preferably appear along one edge of the display screen.

A removable mask surrounds the display screen and includes a temperature scale with marked intervals corresponding to and in alignment with each of the bar segments on the display screen. Thus, a different temperature scale may be employed by simply removing the mask surrounding the display device and replacing it with a mask having the new scale.

The program input devices preferably take the form of a series of low cost push-buttons. In one embodiment of the invention, one button switches the device between the operating mode and one or more programming modes. A second set of one or more buttons are operable to increment the time register, and a third set of one or more buttons are operable to adjust the limits in the displayed temperature range.

Control means is provided for determining the length of time that any one of the above described buttons is being held in a depressed or "on" position, and generating a digital electrical signal which is a function of the length of time the button is being depressed. In this manner, "tapping" a button (holding it for less than a preselected time period) may cause the particular parameter affected by that button to decrement, while "holding" that button, (maintaining the button in a depressed condition for greater than a specified time period) will cause the displayed parameter affected by that button to increment. This control may also include logic which, after determining that a particular button is being "held", continues to increment the parameter affected by that button for each additional preselected time interval that the button is maintained in a depressed condition. This simple means for enabling a single pushbutton to perform a plurality of operations is advantageous because it reduces the number of program input components in the device and saves steps in the programming and operation of the device.

The preferred embodiment of the invention employs integrated semiconductor circuits to implement all of the digital functions including the oscillator, time base, memory and the comparators. This circuitry may take the form of one or more integrated circuit chips with interconnections to the display, the temperature sensing element, the programming input devices and the output switch. The output switch may take the form of a solid state switch or hard contact. If a solid state switch is employed it may or may not be formed as a part of the integrated circuit depending upon various economic and technical factors. The logic circuitry in the thermostat is preferably implemented with a suitable programmed microprocessor.

BRIEF DESCRIPTION OF THE DRAWINGS

In the drawings, which form an integral part of the specification and are to be read in conjunction therewith, and in which like reference numerals are employed to designate identical components in the various views:

FIG. 2 is a flow chart illustrating the preferred manner of operation of the hold/tap logic employed in the present invention;

FIG. 4 illustrates the preferred manner of allocating the program memory utilized in the present invention to accomodate the time-temperature entries;

DETAILED DESCRIPTION OF THE PREFERRED EMBODIMENT

Figure 1:
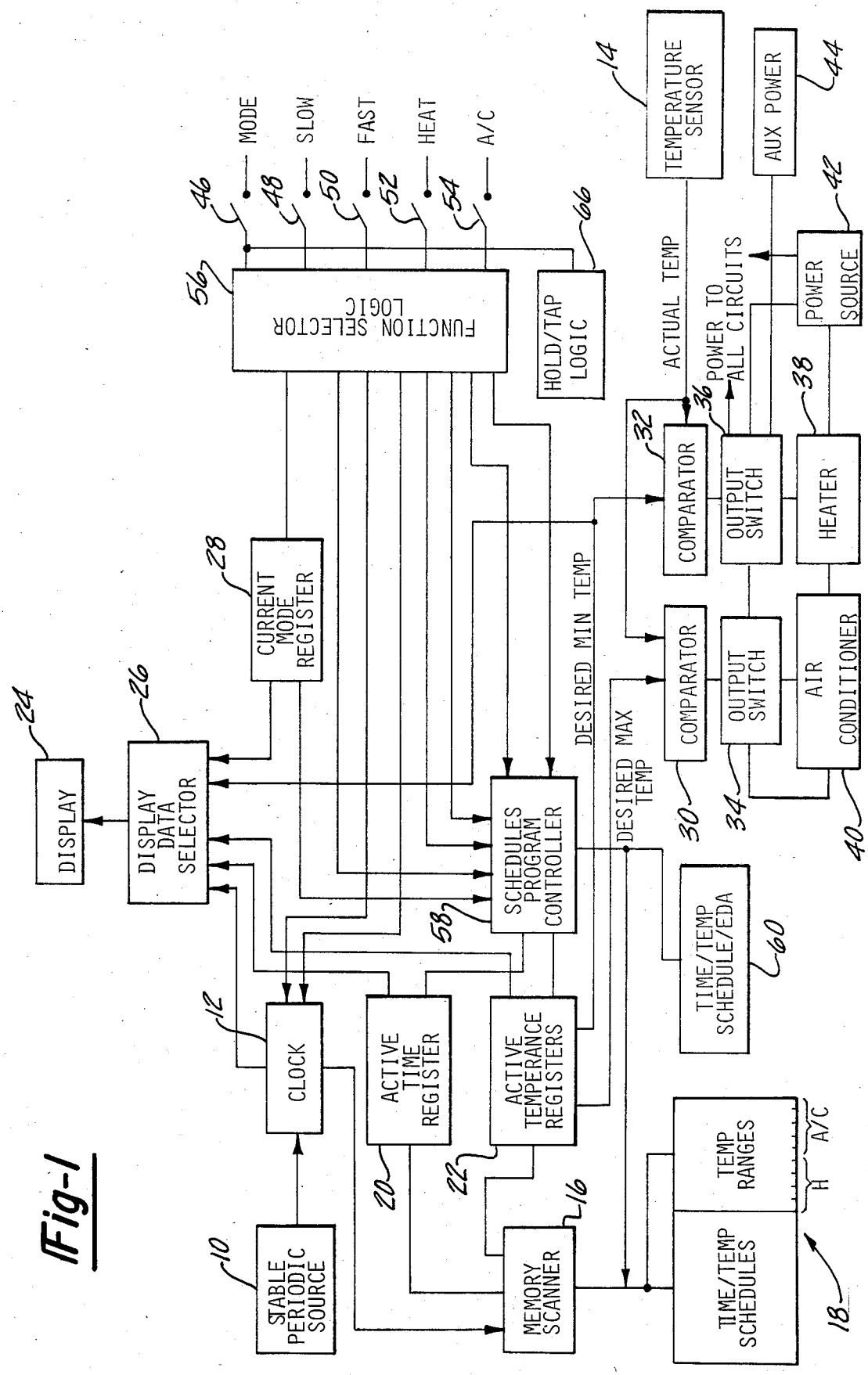
FIG. 1 is a schematic diagram of the present invention.

Referring to FIG. 1, the preferred embodiment of the present invention includes a stable periodic source 10 such as a stable crystal oscillator. The stable periodic source 10 may also take the form of a circuit which provides a periodically switching output using the alternating current power means as a timing source. The stable periodic source 10 should be insensitive to the ambient temperature at the thermostat over the normal operating range of the device and should output a bivalued electrical signal which periodically changes state.

The output of the stable periodic source is provided to a clock 12. The clock 12 preferably employs a dividing chain (not shown) which generates real time signals such as the type employed in digital clocks or watches. In the preferred embodiment, the clock 12 is capable of generating output signals that change state with each second, minute, hour, and day. However, additional signals which change state with the month and year could be provided without departing from the spirit of the invention.

A temperature sensor 14 is provided for supplying a temperature dependent digital signal reflective of the ambient temperature on the thermostat. The temperature sensor 14 typically includes a variable frequency oscillator employing a thermally sensitive element having some electrical property that varies as a function of the ambient temperature.

Output from the clock 12 is provided to a memory scanner 16 which interrogates a programmed memory 18 to obtain the current desired temperature range from a programmed schedule of times and temperatures. The memory scanner 16 in cooperation with the schedules program controller 58 is also preferably operable to provide the current scheduled time and temperature settings to the active set time register 20 and active temperature registers 22. The active time and temperature registers 20–22 may be any suitable type of temporary storage device such as random access memory and are utilized to provide values corresponding to the current schedule time and temperatures information to various other components in the thermostat as will be described hereinafter.

A display device 24, preferably taking the form of a liquid crystal device, receives one or more binary signals from a display data selector 26 corresponding to current time, current ambient temperature, the active scheduled time and temperature range, or one of the programmed time and temperature ranges, and the current programming mode. Current time information is obtained by the display data selector 26 via input from the clock 12. The current ambient temperature information is obtained from the display data selector 26 from the temperature sensor 14. Mode information is input to the display data selector 26 from the current mode register 28, and time and temperature range information pertaining to the programmed schedule are obtained by the display data selector 26 via input from the appropriate memory locations 18, 20–22. During normal operation, the display data selector 26 provides signals to the display 24 which displays the current ambient temperature (see FIG. 6). In addition, the display data selector 26 may provide signals for the display of other of the above described information in various formats depending upon the current mode as will be described in further detail hereinafter.

Outputs of the minimum and maximum temperatures describing the current active temperature range is provided respectively to a pair of comparators 30–32. Each of the comparators 30–32 receives digital signals corresponding to the current ambient temperature from the temperature sensor 14. The comparators 30–32 each provide an output signal to a pair of outputs 34–36 which is dependent upon their respective input signals. For example, the output signal of comparator 30 may be a simple two-stage signal having one value when the actual temperature is greater than the desired temperature, and the opposite value when the actual temperature is less than the desired value. The output of comparator 32 could be a similar two-stage signal. Alternatively, the comparators 30–32 could generate a proportional output signal representative of the difference between the actual and desired temperatures, or could be modified in consideration of such factors as the lag time between the time the heater 38 or air conditioner 40 is energized and the time the temperature change actually reaches the thermostat.

It should be noted that a single comparator may be provided in place of comparators 30–32 which performs the function of determining whether the actual temperature is outside of the current programmed temperature range and outputting a signal to one of the outputs such as 34 or 36 dependent upon the results of that comparison without departing from the spirit of the present invention.

It should also be noted that additional details pertaining to the various components of the present invention as described herein and their function may be obtained by reference to either of Applicant's aforementioned patents which are incorporated herein.

Power for the circuit is preferably obtained from the source 42 by tapping across the switch contacts when they are opened, or across the series resistor (not shown) in the output circuit when the switch contacts are closed. An auxiliary power source 44 is also provided, preferably in the form of a 5-year, 1,000 hour alkaline 9-volt battery. This auxiliary power source 44 provides sufficient power to the thermostat to prevent destruction of the programmed time-temperatures schedules stored in RAM during temporary power outages and allows the user to program the thermostat prior to its installation.

Program input means in the form of a plurality of push-buttons 46–54 are provided for inputting the desired time-temperatures schedule into the program memory 18, setting the clock 12, and receiving any of the above described information on the display. Conventional, low cost push-buttons of the type used with digital watches may be employed for this purpose. In the preferred embodiment, five program input buttons labeled MODE, SLOW, FAST, HEAT, and A/C are provided.

Function selector logic 56 is connected to each of the buttons 46–54 in order to monitor their respective states (i.e. open or closed) and provide output signals to various components of the system as a function of the state of the program input buttons 46–54 and the current mode of the system, as will be described in more detail hereinafter.

It should be noted that hold/tap logic 66 is preferably provided for monitoring the state of each of the program input buttons 46–54 and providing information to the appropriate function selector module 56–64 which is dependent upon that state. In particular, the hold/tap logic 66 interrogates the condition of each of the program input buttons 46–54 to determine if any one of the buttons is in a depressed position. If one of the program input buttons 46–54 is found to be in a depressed position, the hold/tap logic outputs one of two signals to the appropriate input button function selector 56–64 which is a function of the duration of time that that button remains in the depressed position.

Referring now to FIG. 2, the hold/tap logic 66 in the preferred embodiment interrogates each of the program input buttons 46–54 to determine if one of them is in the depressed position. If one of the buttons is found to be in the depressed position a period of time is counted, preferably 0.25 seconds and that button is then again interrogated. If the button is no longer in the depressed position, the logic sends a signal to the function selector logic for that button which indicates that the button has been "tapped." If the button is still in the depressed position after the initial 0.25 second count, an additional 0.75 seconds is counted and a "hold" signal is sent to the appropriate function selector logic. Another second is counted and that same button is interrogated and a "hold" signal is issued for each additional second that the button is found to have remained in the depressed position. In this manner, each of the buttons can perform a specific operation when tapped and a different operation when held. In the preferred embodiment the function affected by the particular program input button 46–54 is decremented one unit each time the button is tapped and is incremented for one unit for each second that it is held.

Figure 3:
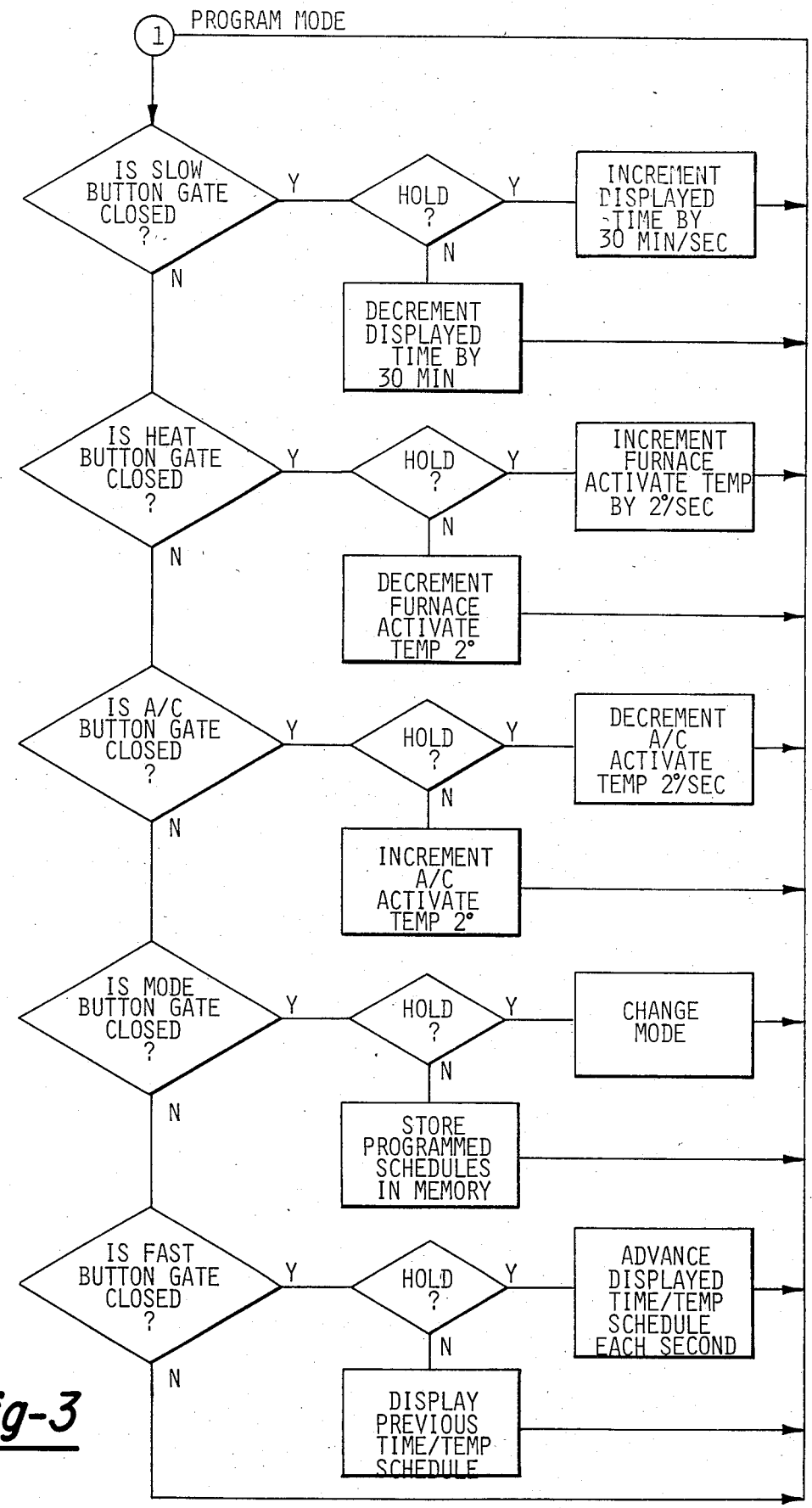
FIG. 3 is a flow chart illustrating the preferred manner of operation of the function selector logic when the present invention is in PROGRAM mode.

FIG. 3 is a flow chart illustrating the operation of the function selector logic 56 when the thermostat is in PROGRAM mode. In this mode, the function selector logic 56 will output a signal to the schedules program controller 58 to increment the displayed time by 30 minutes for each second that the SLOW button 48 is held and decrement the displayed time by 30 minutes for each time that the SLOW button 48 is tapped. Similarly, the function selector logic 56 will adjust the lower temperature limit in the displayed range when the HEAT button 52 is depressed, and adjust the upper temperature limit in the displayed temperature range when the A/C button 54 is depressed. Thus, by operating the SLOW, HEAT, and A/C buttons 48,52,54 in PROGRAM mode, a particular time and temperature range may be displayed.

Additional time-temperature ranges may be programmed by depressing the SLOW button 48 to change the displayed time and subsequently adjusting the temperature range associated with that time by operation of the HEAT and A/C buttons 52,54. Each of the time-temperatures input during the programming stage are stored by the scheduled program controller 58 in a temporary buffer 60. The user may review any of the time-temperatures by depressing the FAST button 50. In PROGRAM mode, this button can be tapped or held to display the previous or subsequent time-temperatures entries in the schedule respectively. Thus, by maintaining the fast button 50 depressed, the user can quickly review all of the time-temperature entries that have been programmed in a rapid and convenient manner. The time-temperatures settings may be stored into program memory 18 by the user by tapping the MODE button 46.

In the preferred embodiment, six different times and corresponding heating/cooling temperatures can be entered for a particular one-day schedule. When the MODE button 46 is tapped, the schedules program controller 58 causes the initial time-temperatures schedule to be automatically entered into all seven days of the program memory 18. Once the initial schedule is entered into program memory 18 for the entire cycle (seven days), time-temperatures entries may be added, deleted, or changed for any particular day of the week.

If a particular time-temperatures entry is to be added to a particular day, the FAST, SLOW, HEAT, and A/C buttons may be operated in the above described fashion to change the display to reflect the time-temperatures entry desired. This new displayed time-temperatures entry is automatically stored by the schedules program controller 58 in the program memory 18 for that particular day and time.

A particular time-temperatures entry may be deleted from program memory 18 by the schedules program controller 58 by holding either the HEAT or A/C buttons until the line of segments defining the range appearing on the display all disappear.

A particular time-temperatures setting may be changed in program, memory 18 by the schedules program controller 58 by operating the FAST button until that time-temperatures setting is displayed and subsequently altering the temperature range by operation of the HEAT and A/C buttons.

The preferred embodiment has WAITING, SET CLOCK, HOLD, and HOLD UNTIL modes in addition to the PROGRAM and normal operating modes. The MODE button 46 displays each of the last five modes when it is held in a depressed position. To enter any one of these modes, the MODE button 46 should be depressed until the desired mode is displayed and then released. It should be noted that the function selector logic 56 is operable to monitor the program input buttons 46-54 and provide signals to the appropriate system component depending on the current mode. It will be understood by those skilled in the art that the described operation of the various program input buttons 46-54 in each of the described modes is accomplished by suitably programming the function selector logic 56 to perform the described functions.

In the SET CLOCK mode, the FAST and SLOW buttons 48,40 may be utilized to set the real time clock 12 on the thermostat. The FAST button causes the display data selector 26 to increment or to decrement the displayed time in four hour steps. The SLOW button similarly increments or decrements the displayed time in ten minute steps. When the correct real time is shown on the display, the MODE button should be tapped to store the displayed time in the system clock 12.

HOLD mode allows the user to suspend the programmed time-temperatures schedule and hold the thermostat in a specified temperature range until further notice. To program this feature, the user holds the MODE button 46 until the word HOLD is displayed. The HEAT and/or A/C buttons may then be operated to display the held temperature range. When in this mode, the display data selector 26 causes the display 24 to show the HOLD temperature range and the words PROGRAM HOLD. The schedules program logic 58 then causes the HOLD temperature range to replace the active registers 20-22. To end HOLD mode and resume the programmed time-temperatures settings, the user may depress the MODE button 46 until the words PROGRAM HOLD disappear. At this point, the schedules program logic 58 causes the appropriate scheduled time-temperatures entry to be loaded into the active registers 20-22.

The MODE button 46 may also be depressed to display HOLD UNTIL. This mode allows the user to enter a particular temperature range by operation of the HEAT and A/C buttons 52,54. The FAST button 50 is operated to select the future time-temperatures set point where the user wants to resume the programmed schedule. The MODE button may then be tapped to display the current room temperature and the words HOLD UNTIL. The schedules program controller will store the HOLD UNTIL entries in the active regularly programmed schedule registers 20-22 until the indicated future time temperatures set point is scheduled to become active. At this time the logic will load these into the active registers 20-22 and HOLD UNTIL will then disappear from the display 24.

If the user attempts to manually program the thermostat to start the air conditioner during the period immediately following a power shutdown, the word WAITING will appear on the display 24 to indicate that the thermostat is in waiting mode, and will remain displayed until the six-minute waiting period has elapsed.

In this mode, the thermostat will not allow the air conditioner to be restarted for six minutes after it has been shut-off. Since some of the liquid in the compressor may have vaporized during the power failure, this automatic six-minute delay allows for that vapor to return to the liquid state, thereby insuring that the compressor pump will be pumping liquid when the air conditioning unit is restarted after the six-minute delay.

The logic necessary to implement the programming and operation of each of the above described modes has been illustrated as function selector logic 56, hold tap logic 66, schedules program controller 58, memory scanner 16, and display data selector 26. The means for performing these functions is a combination of simple hardware logic devices and/or micro code which may be duplicated by one skilled in the art to perform the above described functions.

Referring to FIG. 4, the program memory 18 of the present invention is allocated in an efficient manner allowing for a relatively large number of time-temperatures entries and temperature ranges to be programmed into a relatively small amount of memory. The portion of program memory 18 allocated for the time-temperatures schedule consists of seven blocks. Each of the seven blocks contains six 9-bit words with each word corresponding to a particular time-temperatures entry. Each of the blocks 70 corresponds to a day in the week. Each of the words 72 is a particular time-temperatures entry. Thus, the preferred embodiment allows for six time-temperatures entries for each of seven days of the week or forty-two entries.

Since the time entries may be at half hour increments, there are forty-eight different times identifiable for each day. The first six bits 74 of each word are utilized to indicate which of the forty-eight times has been programmed for this entry. The last three bits indicate which of eight different temperature ranges are associated with this time entry. These three bits correspond to an address in a 64-bit temperature range table consisting of eight 8-bit words each corresponding to a particular temperature range. Each of the upper and lower temperatures defining the range may be any one of the sixteen possible temperature values, so 4 bits are allocated for each of the temperatures. The temperature range for a particular time-temperatures entry is then indicated in the word corresponding to that entry by 3 bits which identify the address of the range found in the temperature range table 80. Since 3 bits rather than 8 bits is used for each of the words 72 in the time-temperatures entry table 71, the memory requirements for the system have been reduced by about 25% or a total of 146 bits.

Figure 5:
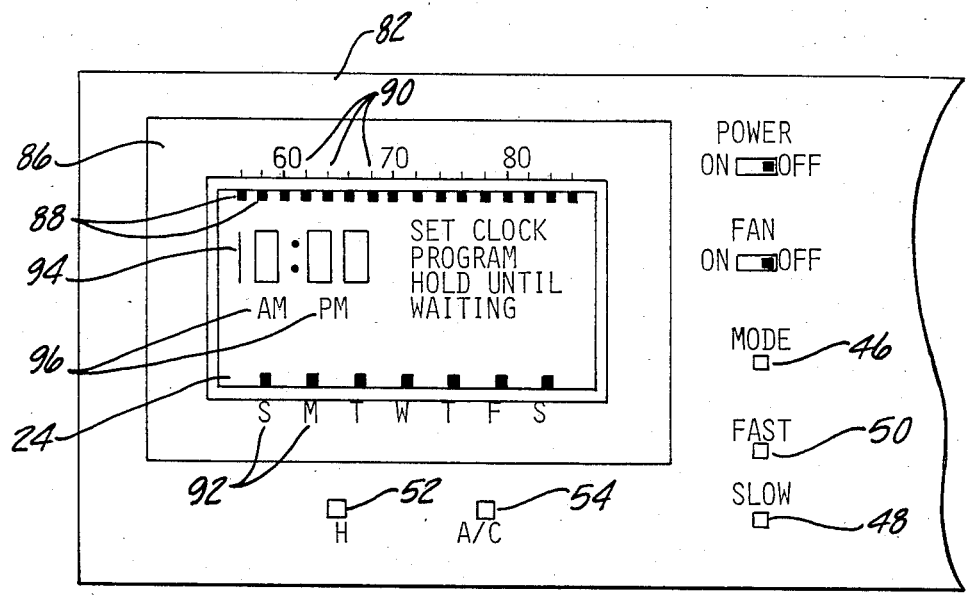
FIG. 5 is a partial front view of the face of the programmable thermostat.

Referring to FIG. 5, the face 82 of the thermostat includes a display device 24 and a display mask 86. As previously described, the display 24 is preferably a liquid crystal device. The temperature range is displayed as an energized linear segment, preferably a series of discrete bars 88 spaced side-by-side in a linear fashion, across one edge of the display 24. To display a particular temperature pair, the indicia corresponding to each of the temperatures, as well as all those temperature settings therebetween, are energized in contrasting color to the remaining temperatures indica along the scale. A selected temperature scale 90 is marked along the adjoining edge of the mask 86 and contains markings corresponding to each of the segments 88 on the display 24 which indicate the temperature value of each of the segments on the scale. In the preferred embodiment, the mask 86 is removably secured to the face 82 of the thermostat so that a mask employing a different temperature scale may be easily substituted in the device. As will be appreciated by those skilled in the art of human factors design, the temperature bar display format of the present invention provides the user with an instant impact relating to the operating range resulting from the selected temperature pair.

A second series of indicia in the form of discrete energizable markings or segments 92, corresponding to each of the seven days of the week is preferably located along a different edge of the display 24. A second scale corresponding to these segments is marked along the edge of the mask 86 adjacent to the edge of the screen 24 containing the segments and preferably includes letters 92 corresponding to abbreviations for each day of the week. Again it should be noted that abbreviations for days of the week in different languages may be substituted by simply removing the mask 86 surrounding the display 24 from the face 82 of the thermostat. A twelve hour digital display and A.M. and P.M. designations 96 are provided for displaying either the real time or a time corresponding to a particular time-temperatures entry. Lastly, the words "SET CLOCK", "PROGRAM", "HOLD UNTIL", and "WAITING" are also displayed, depending on the current mode.

Figure 6:
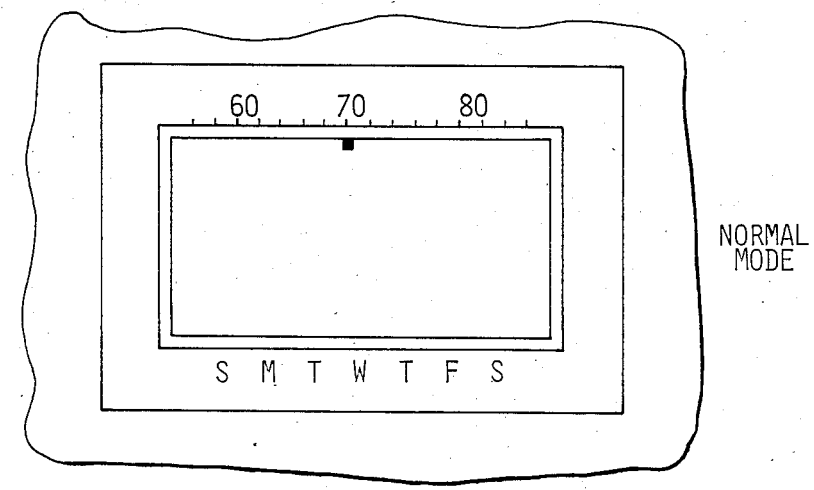
FIG. 6 is a front view of the display and display mask of the thermostat when the device is in NORMAL mode.
Figure 7:
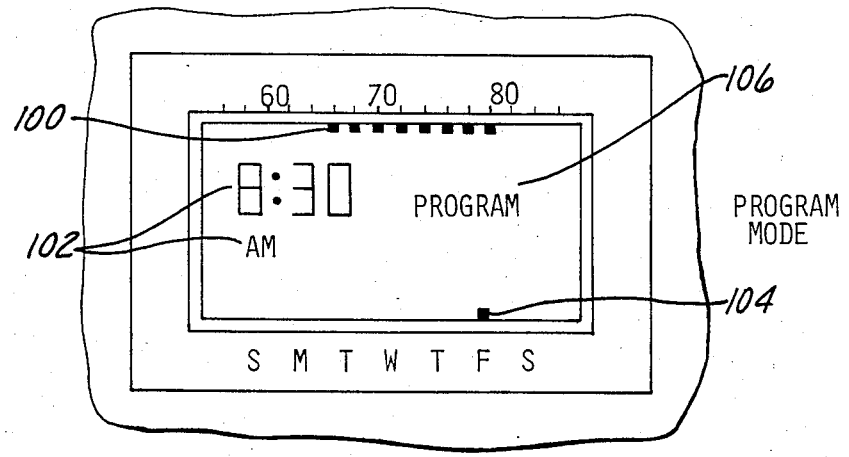
FIG. 7 is a front view of the display and display mask of the thermostat when the device is in PROGRAM mode.

While FIG. 5 shows all of the information that may be displayed on the face 82 of the thermostat, in the preferred format only selected portions of the information are provided to the display 24 by the display data selector 26 in any particular mode. As shown in FIG. 6, indicia in the form of an energizable segment corresponding to the current temperature is the only information displayed in the normal operating mode of the device. FIG. 7 shows the information displayed while in PROGRAM mode. This information includes the temperature range 100 corresponding to one of the time-temperatures entries, the time 102 including the day 104 for that time-temperatures entry, and the word PROGRAM indicating that the device is currently in PROGRAM mode.

We claim:

1. A thermostat for controlling the application of electrical power to temperature modifying loads comprising:
   a clock operative to generate digital electrical signals having values representataive of real time;
   a programmable, digital memory;
   program input means for loading said memory with a plurality of separate entries each entry including a pair of digital signals representing two temperatures defining limits of a desired temperature range at a particular time over the a repetitive time cycle;
   display means for displaying a particular time and said corresponding temperature range;
   circuitry for applying the output of the clock to the memory to generate a digital electric signal representative of the upper and lower limits of the desired temperature range at a particular time as stored in a selected entry; and
   means for receiving an electrical signal having a characteristic which is a function of the ambient temperature and for receiving the generated output of the memory and for generating control signals for said loads.

2. The thermostat of claim 1 wherein the program input means for loading said selectively memory includes means for selectively raising and/or lowering each of the two temperatures defining the limits of the temperature range.

3. The thermostat of claim 2 including means for adjusting one of the temperatures defining one of the limits of the temperature range in the direction of the opposite limit of the range, to a value beyond the opposite limit of the range, for deleting the temperature entries representing the limits of the range from the memory.

4. The thermostat of claim 1 wherein said program input means includes one or more push-buttons and function control means operable to adjust a programmed parameter in one direction if the push-button is depressed for a period of time less than a first specified period of time and to adjust that parameter in the opposite direction if the push-button is depressed for a period of time greater than said first specified period of time.

5. The device of claim 4 wherein the function control means includes means for adjusting the programmed parameter in said opposite direction by one increment in the temperature range for each additional second specified time period that the push-button is maintained in a depressed position.

6. The device of claim 1 wherein said display means for said corresponding temperature range comprises graphic means representing a linear succession of temperatures and means for providing graphic emphasis to the band within said series defining said desired temperature range.

7. The thermostat of claim 1 further including means for controlling the memory to cause the display of entries associated with particular times.

8. The thermostat of claim 7 wherein said means for controlling the memory to cause the display of entries associated with particular times includes a two-state control device and means for generating displays of sequence of entries, with each entry being displayed for a particular period of time.

9. The thermostat of claim 8 wherein said two-state device comprises a push-button and the memory is interrogated to sequentially generate the display of a program entry in a forward chronological order when the push-button is depressed for a period exceeding a predetermined time and the memory is interrogated to display an entry in the reverse chronological order when the push-button is depressed for a period less than said specified time.

10. The thermostat of claim 9 wherein said means for controlling the memory to cause the display of entries associated with particular times includes means for sequentially generating the display of an additional programmed entry in chronological order for each additional second specified time period that the push-button is maintained in a depressed position.

11. The thermostat of claim 1 wherein the repetitive time cycle consists of a week and said memory includes seven sections, each associated with a particular day in the week and further including means for storing a plurality of temperature ranges associated with programmed entries and storing signals corresponding to said stored temperature ranges in one of said sections of the memory in which the time portion of an entry to be used in association with the said stored range is stored.

12. A thermostat for controlling the application of electrical power to one or more temperature modifying loads, the thermostat comprising:

a clock operative to generate digital electrical signals having values representative of real time;

a programmable, digital memory;

program input means for loading said memory with a plurality of separate entries each comprising digital signals representing desired temperature ranges at particular times over a repetitive time cycle;

display means for displaying a particular time and corresponding temperature range, the display means including:

energizable indicia corresponding to indicated points on a linear temperature scale, each of the energizable indicia representing a particular temperature on the scale, the programmed temperature range being displayed by energizing the indicia corresponding to each of the upper and lower temperatures defining the range and each of the temperatures therebetween;

control means for applying the output of the clock to the memory for selecting one of said plurality of entries, to generate digital signals representative of the upper and lower limits of the desired temperature range at a particular time as stored in selected entries; and means for receiving the electrical signal having a characteristic which is a function of the ambient temperature and the digital signals and for generating control signals for said temperature modifying devices.

13. The thermostat of claim 12 wherein the program input means includes one or more push-buttons operable to raise and lower each of the two temperatures defining the limits of the temperature range.

14. The thermostat of claim 12 including control means for deleting a displayed time-temperature entry from the programmable, digital memory when each of the energizable segments defining the selected temperatures in that entry have been deenergized by operation of the programmed input buttons.

15. The device of claim 12 wherein the display means is surrounded by a removable mask containing a temperature scale marked in a preselected unit of measurement corresponding to each of the intervals in the temperature range.

16. The device of claim 15 wherein said removable mask includes indicia contiguous with and corresponding to each of the display markings corresponding to days of the week, said indicia representing a recognizable abbreviation for each of the days of the week in a preselected language.

* * * * *